Figure 1:
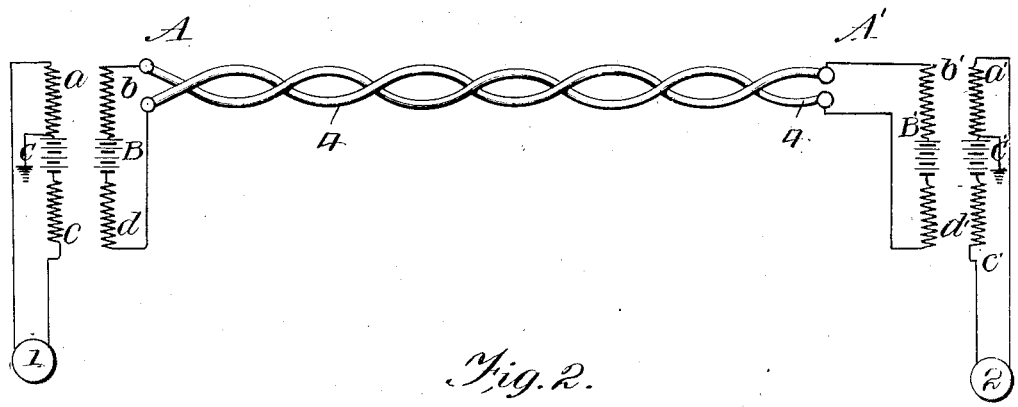

No. 863,247. PATENTED AUG. 13, 1907.
W. C. YEATMAN.
METHOD OF AND APPARATUS FOR TRANSMITTING ELECTRICAL ENERGY.
APPLICATION FILED FEB. 7, 1903.

Witnesses:

Inventor:
Walter C. Yeatman.
by A. Miller Reyfield
Attorney.

UNITED STATES PATENT OFFICE.

WALTER C. YEATMAN, OF CHICAGO, ILLINOIS, ASSIGNOR TO AMERICAN TELEPHONE AND TELEGRAPH COMPANY, A CORPORATION OF NEW YORK.

METHOD OF AND APPARATUS FOR TRANSMITTING ELECTRICAL ENERGY.

No. 863,247.      Specification of Letters Patent.      Patented Aug. 13, 1907.

Application filed February 7, 1903. Serial No. 142,338.

*To all whom it may concern:*

Be it known that I, WALTER C. YEATMAN, a citizen of the United States, residing at Chicago, in the county of Cook and State of Illinois, have invented a certain new and useful Improvement in Methods of and Apparatus for Transmitting Electrical Energy, of which the following is a full, clear, concise, and exact description, reference being had to the accompanying drawings, forming a part of this specification.

My invention relates to the method of and apparatus for increasing the efficiency of transmission of alternating currents, such for example, as those used in telephony, by diminishing attenuation of the current carried by the conductor.

In the transmission of alternating currents, it is well known that the high capacity of closely associated conductors is a great hindrance to economic transmission, and a preventive of transmission through underground cables of any great length. The limit of distance to which speech can be telephonically transmitted, so as to be commercially intelligible is for: 22 gage cable 17 miles, 19 gage cable 25 miles. 16 gage cable 44 miles. This is not caused by any losses due to capacity itself, which is a function of the medium surrounding the conductor or pair of conductors, by which it is capable of storing up and restoring energy to the circuit. There is a certain amount of loss, known as dielectric hysteresis, due to this process, which however, is trifling when compared to the other losses of energy in the cable. This may be more thoroughly understood by considering that there are two components of current present in the conductor, one in phase with the electromotive force, and tending to do useful work at the receiving end, and the other a capacity current, a quarter period in advance of the electromotive force, representing a successive charging and discharging of the medium surrounding the conductor. This latter current may be, and is, in a telephone cable, many times greater than the useful current. The resultant current at the transmitting end is therefore far larger than the useful current transmitted to the receiving end. This produces $C^2R$ losses throughout the entire length of the conductor, far greater than would occur if the current at the transmitting end were the same as that at the receiving end. It is obvious, therefore, that anything which will diminish the attenuation of the current flowing through the conductor, by lowering the amount of current necessary to charge the surrounding medium, will increase the efficiency of the circuit.

It has been proposed for a number of years, to obviate the excessive charging current existing in a circuit of this kind, by introducing into the circuit in various manners, reactance coils which should cause a current of equal and opposite effect to the capacity current in the cable, and annul it. None of these proved effectual when tried in actual service until recently, when the theory of the design and placing of such "loading" coils was evolved, and it was found that if they were arranged in series with the conductors, at proper and predetermined intervals, the efficiency of transmission was greatly increased. There are many disadvantages of this arrangement, however, prominent among which is the expense of the coils themselves, and in underground telephone cable work, the expense of the frequent building of vaults and boxes to contain these coils. To this we may add the difficulty of access to these coils which are embedded in an insulating compound and cannot be repaired without removing the entire containing box, and the difficulty due to magnetic induction between different circuits, due to the overlapping magnetic fields of these reactance coils.

The object of my invention is to avoid the objectionable features of the aforesaid arrangement, and to secure the effective reactance in long conductors and cables, necessary to neutralize the capacity thereof, in a simple, inexpensive and practical manner.

In the manner herein set forth for carrying out my invention, I employ a conductor consisting of a central core of metal of high conductivity, such for example as copper, and a sheath of magnetic material of high permeability, such for example as electrolytic iron, which directly surrounds the central core, and through this conductor I pass telephonic voice currents. The result is that the reactance of the circuit is so increased by the presence of the magnetic sheath, that the effects of capacity are neutralized, or practically neutralized, and the efficiency of transmission is greatly increased. By such an arrangement, it will be seen that the cost of the conductor is reduced to a minimum, as there are no coils in the circuit, and no other complications to handle. The conductor can be made a simple one, in the form of a continuous central copper core, directly surrounded by a continuous sheath of electrolytic iron or the like, and this conductor can be laid and used and maintained and handled just as any other simple conductor or wire now in use. At the same time the increase of the effective reactance of the circuit, by the presence of the surrounding magnetic sheath, allows the electrical wave energy to be transmitted long distances with successful and satisfactory results.

As a matter of still further improvement, I arrange to send a direct current through the cable or conductor, at the same time that the voice current is passed through it, and this direct current increases the magnetic flux in the material composing the sheath, and thereby increases the permeability of the same and still further increases the effective reactance. The direct current may be transmitted over the circuit at the same time as the voice currents without interfering with their transmission, by a number of means well known to telephonists. The simplest of these is a "repeating coil" or transformer, at either end of the circuit, in the center of which is the source of constant electromotive force sending the direct current over the line, and the other windings of which are connected to the source and receiver of the voice currents.

Figure 2:
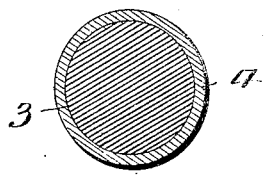

In the accompanying drawing, Figure 1 shows the arrangement of the apparatus for transmitting alternating currents according to my invention; Fig. 2 shows a cross section on an enlarged scale of the conductor to be used; and Fig. 3 shows an enlarged longitudinal view of the same with a part in section.

Referring to Fig. 1, I have shown a pair of composite wires, constructed as hereinafter described, either run aerially, and transposed, or in a cable and twisted between points A and A', it being understood that these are any desired distance apart up to that beyond which commercial transmission can not be given, with the particular conductors being used. This pair of conductors is shown connected at each end to the outer terminals of a "repeating coil" or transformer, which has a source of constant electromotive force B and B', such as a storage battery, capable of sending a constant direct current over the composite conductors. This storage battery is shown in the drawing as free from earth connection, and as being used only for the purpose of sending a direct current through the composite conductors between A and A' for the purpose of increasing the reactance of the circuit. It is obvious that this direct current might also be used for signaling or supervising connection between A and A', and that either or both of the batteries B and B' might be connected to earth, or that one battery only might be used. Where two batteries are employed, as shown, it is not thought advisable in telephonic transmission to connect one side of both of these batteries to earth, as a difference of earth potential between A and A' would then cause an unequal amount of current to flow through the two conductors, thereby causing their self induction to be unequal and the line unbalanced. In practice it would be found that the sources of electromotive force B and B' should be of from 20 to 200 volts electromotive force, the latter value being taken as the highest value which would be found expedient to use as a working pressure in a paper insulated cable. The amount of this current should be kept approximately up to a certain value as hereinafter stated. The other sides $a c$ and $a' c'$ of the repeating coils, comprise, with the grounded storage batteries C and C', and the telephone instruments 1 and 2, the ordinary subscriber's line and cord circuit in use in common battery exchanges, omitting all details of signaling and connecting apparatus. For efficient transmission over the highly self-inductive line between A and A', the windings $b\ d$ and $b'\ d'$ of the repeating coils at either end of the line should be constructed with a larger number of turns than the windings $a c$ and $a' c'$.

Figure 3:
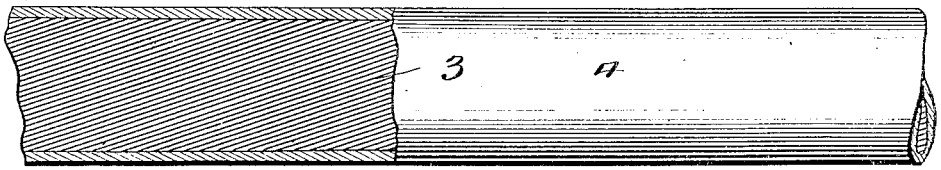

Figs. 2 and 3 show, on an enlarged scale, the construction of the conductor used in this system of electrical wave transmission, the central core 3 being a metal of high conductivity such as copper, and the outer sheath or coating 4, a magnetic material of high permeability and low electrical conductivity, such as electrolytic iron. The conductor—which, to enable the best results to be obtained from the magnetic sheath, should not be of too great diameter—may be constructed in this form, in any suitable manner which will give the large magnetic permeability and small electrical conductivity required. I prefer, however, to secure the iron coating or sheathing by electrodeposition, thus obtaining a metal of the best magnetic qualities.
With electrolytic iron the permeability is extremely high, and the hysteresis losses low, both of which tend to increase the efficiency of transmission. The high permeability of the iron increases the amount of self induction for a given amount of iron, and so lowers the current attenuation. Or, for any required amount of self-induction in the conductor, a thinner coating of electrolytic iron suffices, with a corresponding decrease in the longitudinal electrical conductivity of the sheath, and a like decrease, therefore, in the "skin effect" and eddy current losses, which are among the factors that determine the attenuation of the current waves.

It will be seen that a cable, made up with composite conductors as described, insulated with paper, and twisted in pairs and surrounded with a lead sheath, while possessing the characteristics of neutralizing capacity, and thereby permitting the transmission of electrical wave energy, is a simple continuous cable, easy to manufacture, to lay and to maintain, and avoids the inconvenience and expense of the complicated structures heretofore provided for this purpose. The efficiency of this type of cable for the transmission of alternating currents of high frequency may readily be shown by mathematical calculation.

#16 B. & S. gage 51 pair, paper insulated cable is now being made by one manufacturer, with the following dimensions and constants: Diameter over lead sheath—2⅝″. Diameter over outer conductors—2¼″. Average distance between conductors—.1862″. Grounded capacity per mile—.065 microfarads. Mutual capacity of pair per mile—.042 microfarads. Resistance of pair (loop) per mile—44 ohms. Self induction per mile—.00148 henry.

Assume a telephonic frequency of 1000 p.p.s. and a length of cable of 100 miles, we may calculate the attenuation, or the ratio of final current amplitude by means of the formula:

$$\frac{I_1}{I_0} = e^{-\beta 1},$$

where $l$=length of circuit, and $\beta$=attenuation constant $$\beta = \sqrt{\tfrac{1}{2}\left\{\sqrt{\left(\tfrac{1}{r^2}+C^2\omega^2\right)\left(R^2+L^2\omega^2\right)}+\left(\tfrac{R}{r}-CL\omega^2\right)\right\}}$$

C=mutual capacity of line. $\omega$=angular frequency $2\pi x$ p.p.s. $r$=insulation resistance per mile. R=line resistance (loop) per mile. L=self induction per mile.

For the above cable, $\frac{1}{r}$ is practically 0, and we get:

$$\beta = .0687 \text{ and } \frac{I_1}{I_0} = \frac{1}{963}$$

that is, the amplitude of current at the receiving end is only .00104 that of the transmitting end, which would be insufficient for telephonic speech.

Now let us consider a cable of the same number of pairs in the same sized lead sheath. For comparison we will assume the copper core of the composite wire to be of #16 gage, and the iron plating to be deposited on it, to be .006″ thick. We thus have the constants for the improved cable. Diameter of cable over sheath=2⅝″. Diameter of cable over outer conductors=2¼″. Number of pairs=51. Diameter of copper core of conductor=.0508″. Diameter of composite conductor=.0628″. Distance of conductors apart=.1862″. Resistance of pair (loop) per mile=42.2 ohms. Mutual capacity of pair per mile=.049 microfarads.

The self induction of the composite conductor cable may be calculated by means of the formula:

$$L = \frac{2}{10}{}^9(2 \log_\varepsilon \frac{2D}{d+2t} + 2\mu \log_\varepsilon \frac{d+2t}{d} + \tfrac{1}{2}).$$

L=self induction of pair per centimeter length. D= distance apart of conductors. d=diameter of copper core conductor. t=thickness of iron plate. $\mu$=permeability of iron.

With no currents other than telephonic ones flowing through the conductor, the value of $\mu$ will be about 180 for electrolytic iron. With this value of $\mu$ we get: L= .0217 henry per mile.

We will now assume as before, a telephonic frequency of 1000 p.p.s. and calculate the attenuation in a 100 mile length of the improved cable. Again substituting in the formula, we get:

$$\beta = .0314 \text{ and } \frac{I_1}{I_0} = \frac{1}{23.1}$$

that is, the amplitude at the receiving end is .0433 that of the transmitting end. This is sufficient for commercial transmission of speech, and is 42 times as great as before the introduction of iron into the cable.

By sending a direct current through the cable conductors as shown in Fig. 1, the magnetomotive force so produced causes a constant flux in the iron coating of the conductors, thereby increasing the permeability of the iron, and raising the value of the self induction of the circuit. By sending a current of .1 ampere through the conductors, the magnetizing force set up in the iron coating is about .37 lines per square centimeter, which, for electrolytic iron, would correspond to a permeability $\mu$=400. It is obvious that this will greatly increase the self-induction of the circuit. By substituting in the formula, we get: L=.0557 henry per mile. Substituting in the attenuation formulæ, we get:

$$\beta = .01985 \text{ and } \frac{I_1}{I_0} = \frac{1}{7.28}$$

showing that the amplitude of the current at the receiving end would be 13.7% of that at the transmitting end. This is sufficient for excellent transmission of telephonic speech, and is 132 times as great as the amplitude of the wave of the #16 ga. copper conductor cable first considered. These valuations show that for a periodicity of 1000 per second, which corresponds approximately to that of the transmission of speech, a cable composed of iron plated copper conductors through which a magnetizing current is passed, will transmit a given amount of electrical energy 3½ times as far, for the same efficiency, as the corresponding plain copper wire cable, and without the distortion of wave lengths of the higher frequencies, which occurs in telephonic transmission over ordinary cables. This absence of distortion in the conductor of my invention is due to the fact that the value of the attenuation constant is practically the same for the various telephonic frequencies, so that all frequencies are attenuated alike, and the current waves have substantially the same relation to each other at both ends of the conductor. It results from this that the voice currents are transmitted clearly and distinctly without the muffling effect that accompanies speech transmission over ordinary conductors; and in consequence speech is intelligible even when the conductor is very long and attenuation very great.

It will be understood, that although the foregoing description applies particularly to telephonic speech over cables, my invention is just as applicable to transmission of speech over air lines, or to the transmission of power over long distances by means of alternating currents, and that many changes and modifications can be made without departing from the spirit of my invention.

What I claim is:—

1. The method of transmitting electrical energy, which consists in impressing an alternating high frequency potential upon a conductor consisting of a central core of high conductivity directly surrounded by a thin and longitudinally continuous sheath of magnetic material, substantially as described.

2. The method of transmitting electrical energy, which consists in impressing voice currents upon a conductor consisting of a copper core directly surrounded by a longitudinally continuous iron sheath of high permeability, substantially as described.

3. The method of transmitting electrical energy, which consists in impressing voice current potential upon a conductor consisting of a copper core inclosed within a continuous and contacting thin iron sheath, substantially as described.

4. The method of transmitting electrical energy, which consists in impressing voice current potential upon a conductor consisting of a core of high conductivity, surrounded by a magnetic material, and also developing a substantially steady direct current in said conductor, substantially as described.

5. The method of transmitting electrical energy, which consists in impressing an alternating potential upon, and developing a steady direct current in, a conductor consisting of a central core of metal of high conductivity inclosed within a sheath of magnetic material, substantially as described.

6. The combination with a conductor consisting of a core of material of high conductivity, directly surrounded by a longitudinally continuous sheath of magnetic material of high permeability, of means for impressing voice currents upon said conductor, substantially as described.

7. The combination with a conductor consisting of a conducting core and a magnetic load associated with said core, of means for impressing an alternating potential upon said conductor, and means for developing therein a continuous direct current, substantially as described.

8. The combination with a conductor consisting of a core of material of high conductivity, surrounded by magnetic material, of means for impressing an alternating potential upon said conductor, and means for developing therein a continuous direct current, substantially as described.

9. The combination with a conductor consisting of a central core of material of high conductivity and an inclosing sheath of magnetic material, of means for impressing an alternating potential upon said conductor, and means for developing therein a continuous direct current, substantially as described.

10. The combination of a conductor consisting of a central copper core and a continuous sheath of magnetic material inclosing said core, means for impressing an alternating potential upon said conductor, and means for developing therein a continuous direct current, substantially as described.

11. A telephone wire consisting of a core of non-magnetic metal and a directly applied thin sheath of magnetic metal of large and constant magnetic permeability for telephone waves.

12. The process of reducing the attenuation of current in conductors carrying talking currents, consisting in impressing a talking current upon a conductor having a central core of high conductivity incased in a sheath of electrodeposited iron.

13. The process of reducing the attenuation of current in conductors carrying talking currents, consisting in impressing a talking current upon a conductor having a central core of high conductivity in a directly applied sheath of electrodeposited iron wherein is also developed a steady current.

In witness whereof, I hereunto subscribe my name this 4th day of February, A. D., 1903.

WALTER C. YEATMAN.

Witnesses:
A. MILLER BELFIELD,
I. C. LEE.